United States Patent [19]

Martin

[11] Patent Number: 5,666,531

[45] Date of Patent: Sep. 9, 1997

[54] RECORDABLE CDROM ACCESSING SYSTEM

[75] Inventor: Raymond Martin, El Toro, Calif.

[73] Assignee: Optima Technology Corp., Irvine, Calif.

[21] Appl. No.: 418,275

[22] Filed: Apr. 7, 1995

[51] Int. Cl.⁶ .................................................. G06F 17/30
[52] U.S. Cl. .................... 395/620; 395/601; 711/100; 711/111
[58] Field of Search ............................. 345/600; 395/480, 395/488, 601, 603, 604, 615, 616, 619, 620, 427; 369/32, 48, 54, 58

[56] References Cited

U.S. PATENT DOCUMENTS

| | | | |
|---|---|---|---|
| 5,040,110 | 8/1991 | Miki et al. | 395/600 |
| 5,119,291 | 6/1992 | Flannagan et al. | 395/275 |
| 5,360,651 | 11/1994 | Baxter et al. | 428/64 |
| 5,446,857 | 8/1995 | Russ | 395/427 |

OTHER PUBLICATIONS

International Standard ISO 9660; Information Processing—Volume and File Structure of CD–ROM for Information Exchange, First Edition, Switzerland, 1988, 31 pages. Jan. 1988.

*Primary Examiner*—Thomas G. Black
*Assistant Examiner*—Paul R. Lintz
*Attorney, Agent, or Firm*—Michael J. Ram; Marvin H. Kleinberg; Marshall A. Lerner

[57] ABSTRACT

The Recording Technique provides a directory which indicates the location of only the last version of any stored information or modified entry of stored information, prior versions being transparent to the operating system. The Recording Technique further provides a directory recorded on the CDROM which is transportable to other computers having the Recording Technique installed thereon. As a result, the user of a computer with a CDROM reader will interface with the CDROM in the same manner as with a non-volatile memory device that is read only.

8 Claims, 7 Drawing Sheets

Recordable CD-ROM

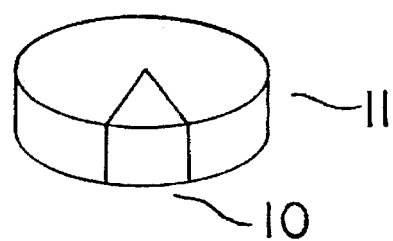
Recordable CD-ROM
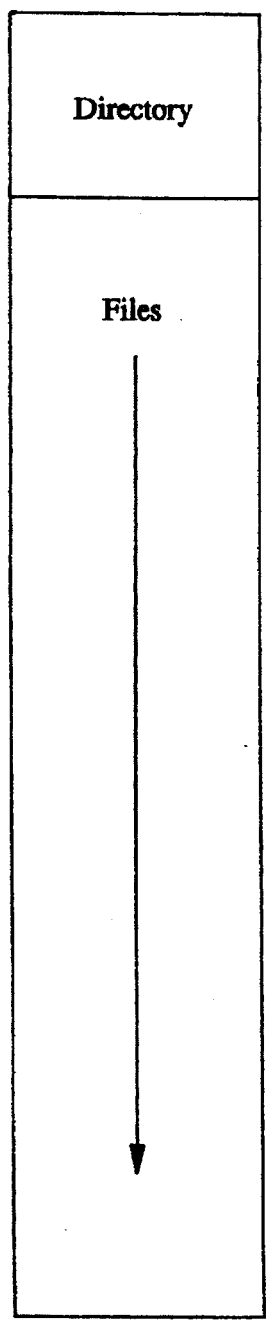
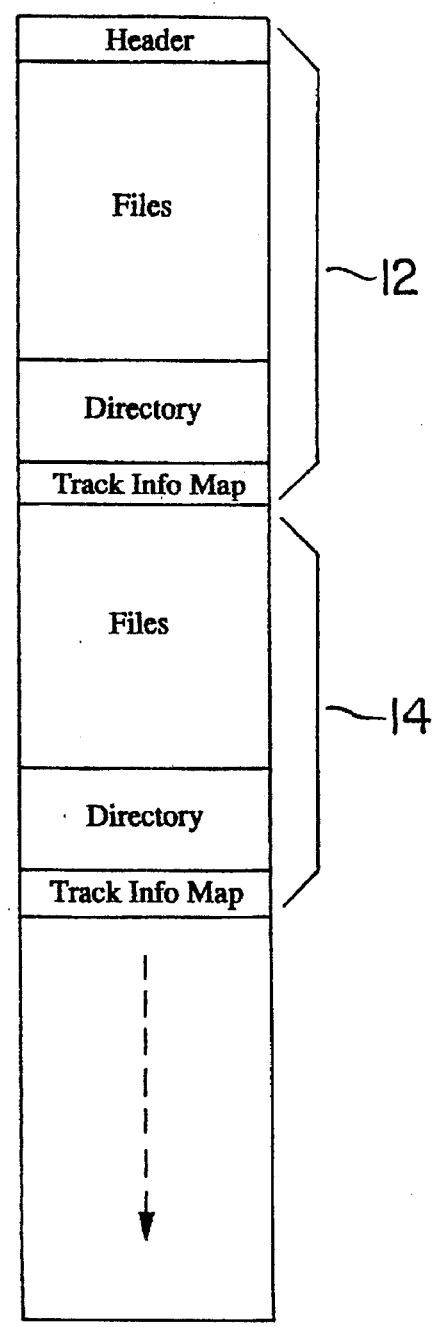
FIG. 2a  FIG. 2b

RECORDABLE CDROM ACCESSING SYSTEM

BACKGROUND

The present invention relates to a new recording technique that allows a standard recordable CD-ROM drive to appear to, and be accessed by, a user in the same manner as a non-volatile memory such as a hard disk or a floppy disk storage media.

A computer's operating system updates information stored on a hard drive or floppy by continuously rewriting portions of the disk. Recordable CD can not be directly interfaced with the operating system because they are WORM (Write Once Read Many) devices. This means that once data is written on the CD disc, it cannot be changed or modified.

The current technique which is used to write to a recordable CDs involves mastering software which has the following drawbacks:

1) It incorporates a file interface that is unfamiliar to the user.
2) The copying process is generally accomplished through track-at-once or disc-at-once recording. This means the user must take great care to pre-plan the copying and dedicate storage resources (the source disk(s)) ahead of time.
3) The user cannot access data being stored on the disc until the track-at-once or disc-at-once recording is completed.
4) These recording techniques are very susceptible to data under run. This means that dedicated high speed data sources are needed.
5) Other mastering techniques may support incremental writing but the data on these discs can only be read by the mastering software. They cannot be used or accessed by the computer operating system or other applications.

Thus there is a need for a technique which allows the CDROM, whether blank or partially written, to appear to a user exactly as would any other storage media, such as a hard disk.

SUMMARY

These needs are met by the present invention which comprises a technique for preparing a directory of a recordable CDROM so that it appears and, to the observation of the operator, functions in the same manner as a directory used in regard to computer magnetic storage media.

The advantages of this approach are:

1) An interface appearance which is familiar to the user makes it easy to write or read files,
2) The technique makes it possible to copy one or more files in an arbitrary manner,
3) Data can be immediately read back without having to conclude recording,
4) Data under run problems are completely eliminated,
5) The technique is compatible with any speed data source,
6) It is possible to open, view, or print files directly from the CD disk using the same applications which would normally be used with a magnetic disk storage system.

DRAWINGS

These and other features, aspects and advantages of the present invention will become better understood with reference to the following description, appended claims, and accompanying drawings, where:

FIG. 2a shows a typical hard disk volume.

FIG. 2b shows a recordable CD volume according to the invention.

DESCRIPTION

Figure 3:
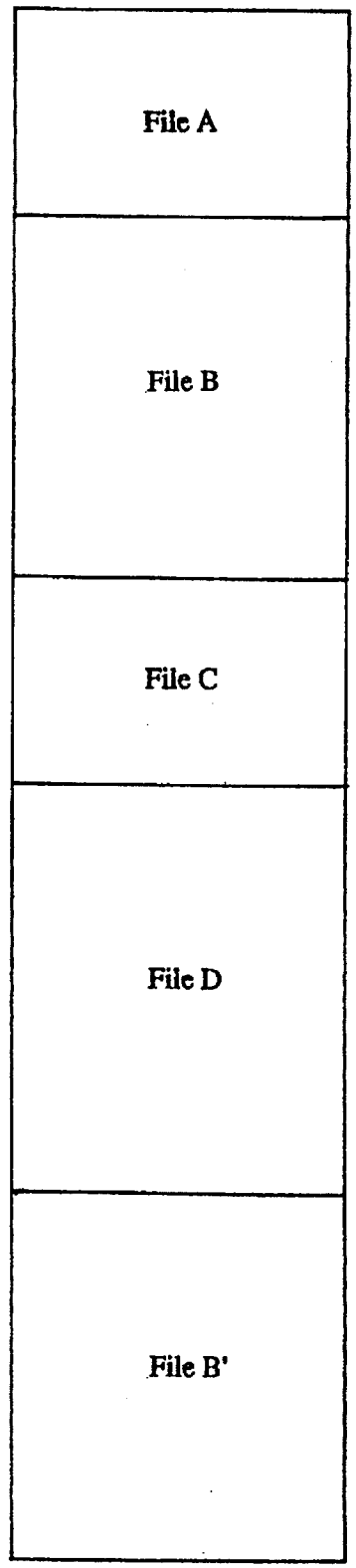
FIG. 3 is a schematic diagram showing the allocation of space on the recordable CDROM.

While this new technique approaches the look and feel of a standard information storage procedure used on hard or floppy disks, once a file has been written to the CDROM the previous version can be neither changed nor modified. This means the recording technique using the invention must be capable of managing files that the user desires to delete or remove because deleting or removing files is a standard feature of a computer's operating system which interfaces with hard or floppy drives. To appear to perform in the same manner, the technique of the invention removes directory entries of files that are to be deleted while the information continues to remain on the CDROM. Accordingly, the operating system's block allocation table still shows this space (File B) as occupied but not belonging to any file, the space and data used by the file continues to remain on the disc (FIG. 3).

As a side effect of this technique, the deleted file can be recovered later if so desired since it continues to exist on the CDROM disc. With a hard or floppy disk, once a file is deleted, the space previously occupied by the file can be used to record another file, causing the data from the original file to be lost.

The new recording technique embodying features of the invention (referred to herein as "Recording Technique") uses existing recordable CD elements in a unique way. These elements are defined in detail in various standards documentation addressing recordable CD, the primary standard referred to by the industry as the Orange Book. The definitions of several elements are summarized below and the method of using these elements in the invention are set forth.

Definitions

User Data Block

Recordable CD's can be created with several different sizes and kinds of user data blocks. A user data block is the smallest accessible unit of data that can be read from a CD. Each user data block has a unique logical block address. The size or type or user data blocks is not critical to the Recording Technique. A particularly suitable size is a 2048 byte data block, but other size data blocks are suitable.

Packet

A packet is a grouping of contiguous user data blocks and is the smallest unit of data that can be written to a recordable CD. A packet consists of 5 run-in blocks, a fixed or variable number of user data blocks, and 2 run-out blocks. Thus, the run-in and run-out blocks occupy 7 logical block addresses. The Recording Technique uses a special equation to correct for the logical block address of the run in and run out blocks when accessing user data blocks in a given packet. Only the fixed type of packet will be used when describing the Recording Technique. The size of the fixed packet is arbitrary but a packet size of 128 user data blocks is a suitable selection.

Track

A track is a grouping of one or more packets. A disc contains many tracks. The Recording Technique ends each track with two special data structures; a directory and a track info map. The directory on any given track occupies one or more packets and contains the cumulative location of all files and operating system information for the disc up to and including the track upon which it resides. The track info map is stored on the last user data blocks on the last packet of the track. The track info map contains the start logical block address of the directory, and the start and end logical block address of every track. The track info map only needs one user data block to store the information for 99 tracks.

Figure 1:
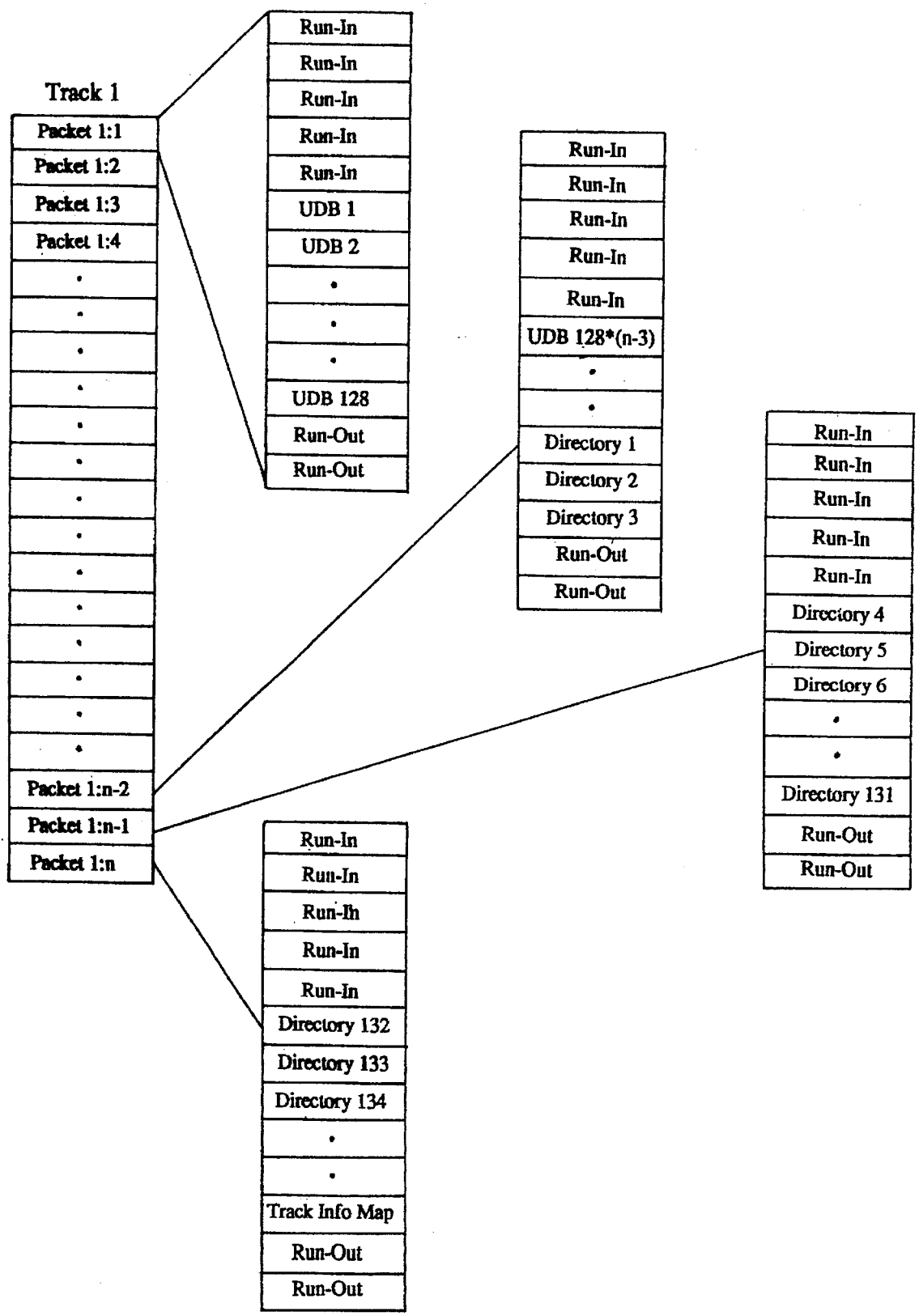
FIG. 1 is a schematic diagram showing the structure of a track written using the technique described by this invention on a CDROM.

The structure of the track, showing the user data blocks, run in and run out blocks, directory, and track info map, is shown in FIG. 1. Track No. 1 is shown to include packets 1 through n. The first packet is shown to include 5 run-in blocks, 2 run-out blocks and 128 user data blocks. Packet 1:n-2 is shown to include the same number of run-in and run-out blocks, 128 user data blocks and directory data blocks 1, 2, and 3. Directory 4 through 131 are shown to continue in packet 1:n-1. Packet 1:n contains the last three directory blocks along with the track info map which contains the start and end logical block addresses for all written blocks as well as the start logical block address of the directory.

Session

A session is a finalized portion of a recordable CD. A recordable CD can contain many sessions. A recordable CD must be finalized before the data newly written on the disc (since the last time the disc was finalized) can be used in a standard CD-ROM drive or reader. The Recording Technique uses sessions to allow the user to repeatedly add and interchange recordable CDs between a CD reader and a recordable CD Drive.

Recordable CD Directory

While WORM devices, such as recordable CDs, can only be written to once, computer operating systems are designed to constantly modify or update portions of a the memory's directory. The Recording Technique accommodates these modifications by temporarily copying the directory of a recordable CD on an available non-volatile memory, such as hard or floppy disk, already connected to the computer (FIG. 2a). The working copy of the recordable CD directory (Portion 10 of disk 11 shown on FIG. 2b) then resides on the available non-volatile memory (hard disk drive) during the entire time the recordable CD is in use by the computers operating system. This allows the computer operating system to freely update and modify the directory for the recordable CD while files are being copied to the recordable CD. Thus FIG. 2a shows a typical hard disk volume while FIG. 2b shows the recordable CD volume according to the invention with the files, directory and track information map for each track shown schematically (i.e. track one 12 and track two 14.) Thus track two 14 includes the directory of track one and two.

Figure 4:
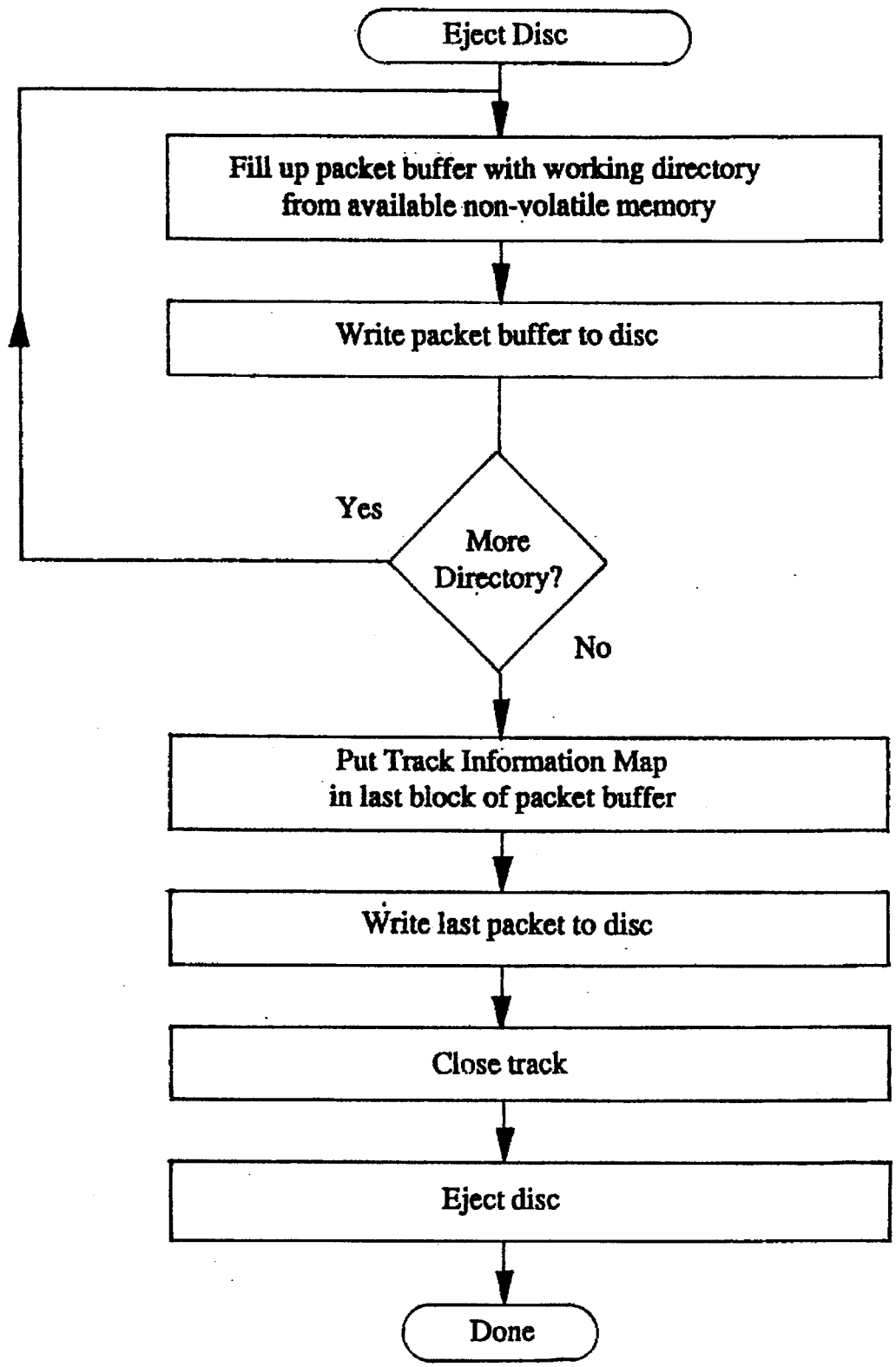
FIG. 4 is a logic diagram showing the response of a computer system operating in accordance with the invention is directed to eject the CDROM.
Figure 5:
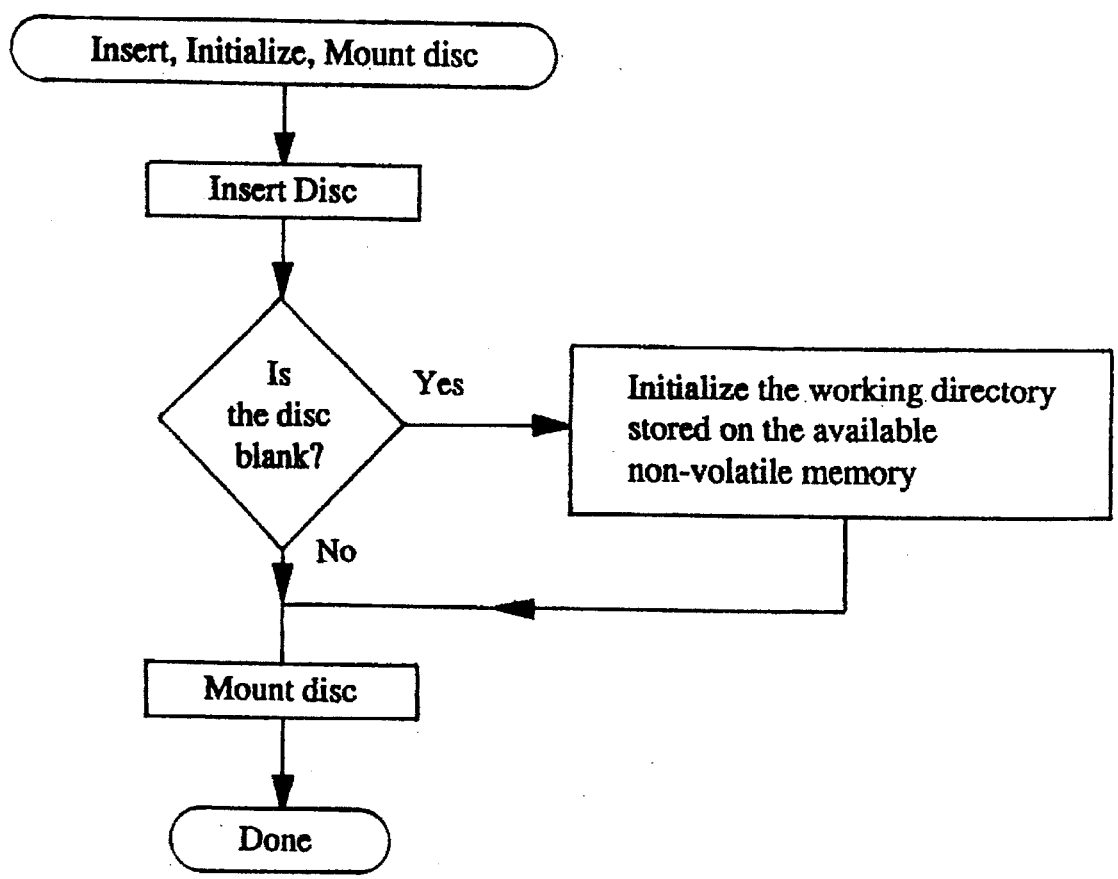
FIG. 5 is a logic diagram showing the response of a computer system operating in accordance with the invention is directed to initialize a disk.

When the computer operating system is instructed to eject the recordable CD, the Recording Technique causes the directory of the recordable CD to be copied from the available disc drive to the end of the first unused track portion of the recordable CD and write the track info map in the location shown in FIG. 1. The track is then closed and the disc is caused to be physically ejected from the recordable CD drive (FIG. 4). In this manner, the recordable CD contains all the information necessary for this disc to be used in another computer.

When a user reinserts the recordable CD into a CD drive attached to a suitably programmed computer, the programmed computer checks to see if the working directory on the available available non-volatile memory belongs to the inserted recordable CD (checks the recordable CD header) and is up to date. If it is, the existing directory is reused. If it isn't, the directory on the end of the last used track on the recordable CD is transferred to the available non-volatile memory.

The directory that is stored at the end of each track is a cumulative directory of the prior tracks on the disc. This means that the directory on the last track contains the location and computer operating system information of all the files in the last track as well as all prior tracks.

The Recording Technique compensates for the computer operating system attempting to delete files on the recordable CD volume and re-use the space occupied by the deleted file, this procedure being incompatible with WORM technology. The Recording Technique compensates for this by rebuilding the computer operating system's file allocation block table so new files are only copied to blank areas of the recordable CD (FIG. 3). The old directory stored on the CDROM continues to include the location of the prior data entry (File B) but any new directories copied to the disc do not include the deleted files and the amended File B appears as File B'.

Writing files to a recordable CD

The Recording Technique allows the user to write files to a recordable CD in a manner similar to a typical computer disk storage media. When a blank recordable CD is inserted into the recordable CD drive, the computer operating system prompts the user to initialize the disc. The initialization process initializes the working directory on the non-volatile memory. After the initialization of the recordable CD is completed, the directory of contents of the recordable CD appears to the user in the same manner as the contents of a standard disk.

Before copying the first file onto a blank recordable CD using the Recording Technique a small header is first written at the beginning of the CDROM (FIG. 2b) to uniquely identify the disc. This allows the Recording Technique to match the directory similarly identified on the non-volatile storage media to the recordable CD.

All write operations to the CDROM consist of fixed packets. The CDROM header and the user file contents occupy the user data block portion of a packet (FIG. 1). The packet writing process continues as new files are copied to the CDROM disc. All computer operating system directory read and write operations occur on the non-volatile disk drive. The Recording Technique also allows the user to read back data prior to concluding the file write process. This allows the user to interleave any number of file read and write operations. Since only the directory of the recordable CD is stored on the available non-volatile memory, the storage requirements on the non-volatile memory are small.

Completing recording on a recordable CD

Once the user has finished recording information to the recordable CD, the computer operating system is used to eject the disc. When an eject command is given to the computer operating system, the Recording Technique first transfers the recordable CD directory from the non-volatile disc drive to the recordable CD using the same packet writing scheme used for writing the user's files. The last user data blocks of the last packet on the track also contain the track info map. The track info map contains the start logical block address of the directory of this track and the start and end logical block addresses for every track written previously on the disc. After the last packet is written, the Recording Technique closes the track and then physically ejects the disc.

Inserting a recordable CD

When the user inserts a recordable CD into a drive, the Recording Technique checks to see if the directory on the available non-volatile memory belongs to the inserted recordable CD and is up to date. If it is, the existing directory is reused. If it isn't, the directory in the last track on the recordable CD is transferred to the non-volatile memory, overwriting the old directory. All computer operating system directory read and write operations to the recordable CD which follow occur on the available non-volatile memory.

Figure 6:
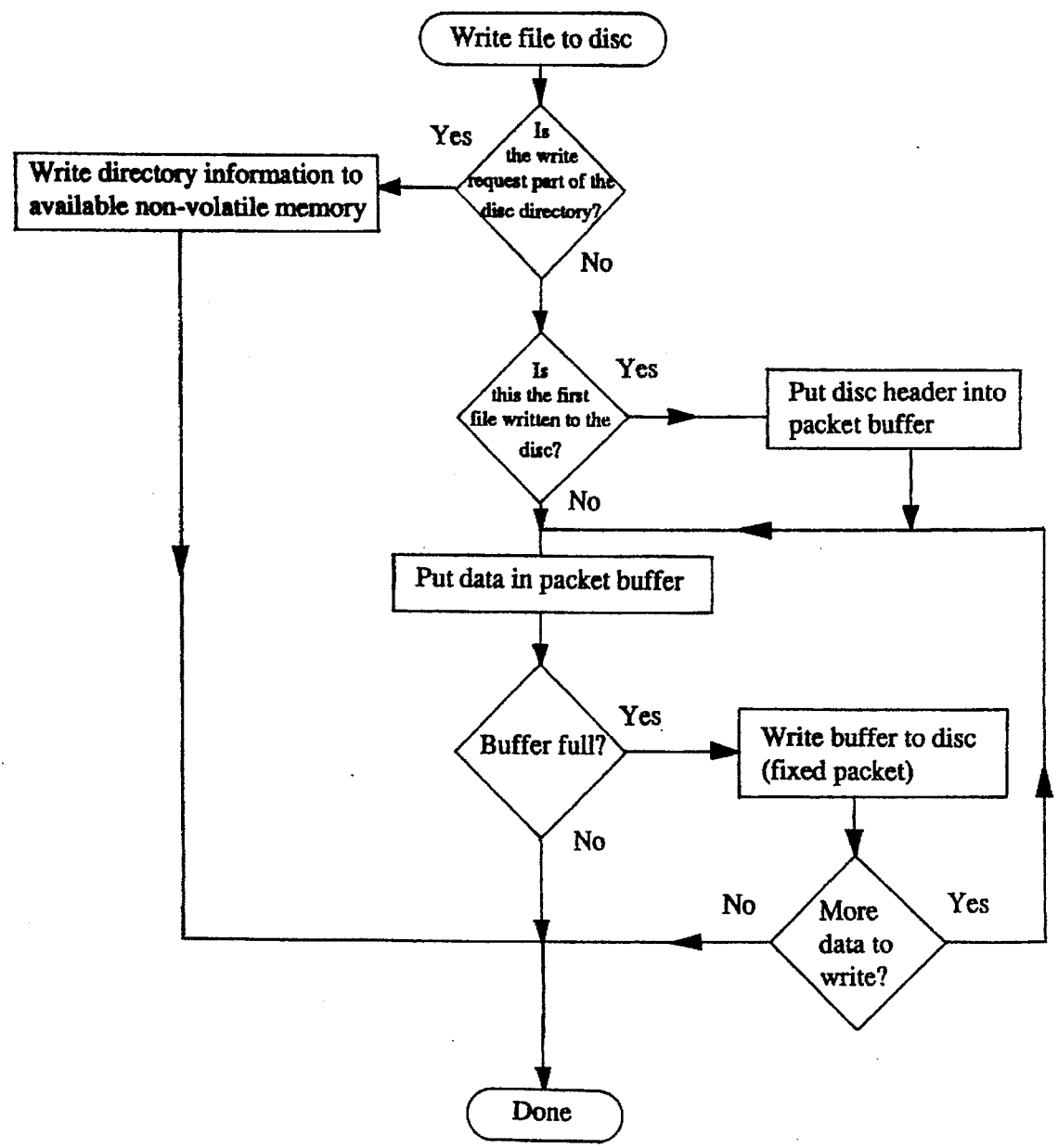
FIG. 6 is a logic diagram showing the response of a computer system operating in accordance with the invention is directed to write to a CDROM disk.
Figure 7:
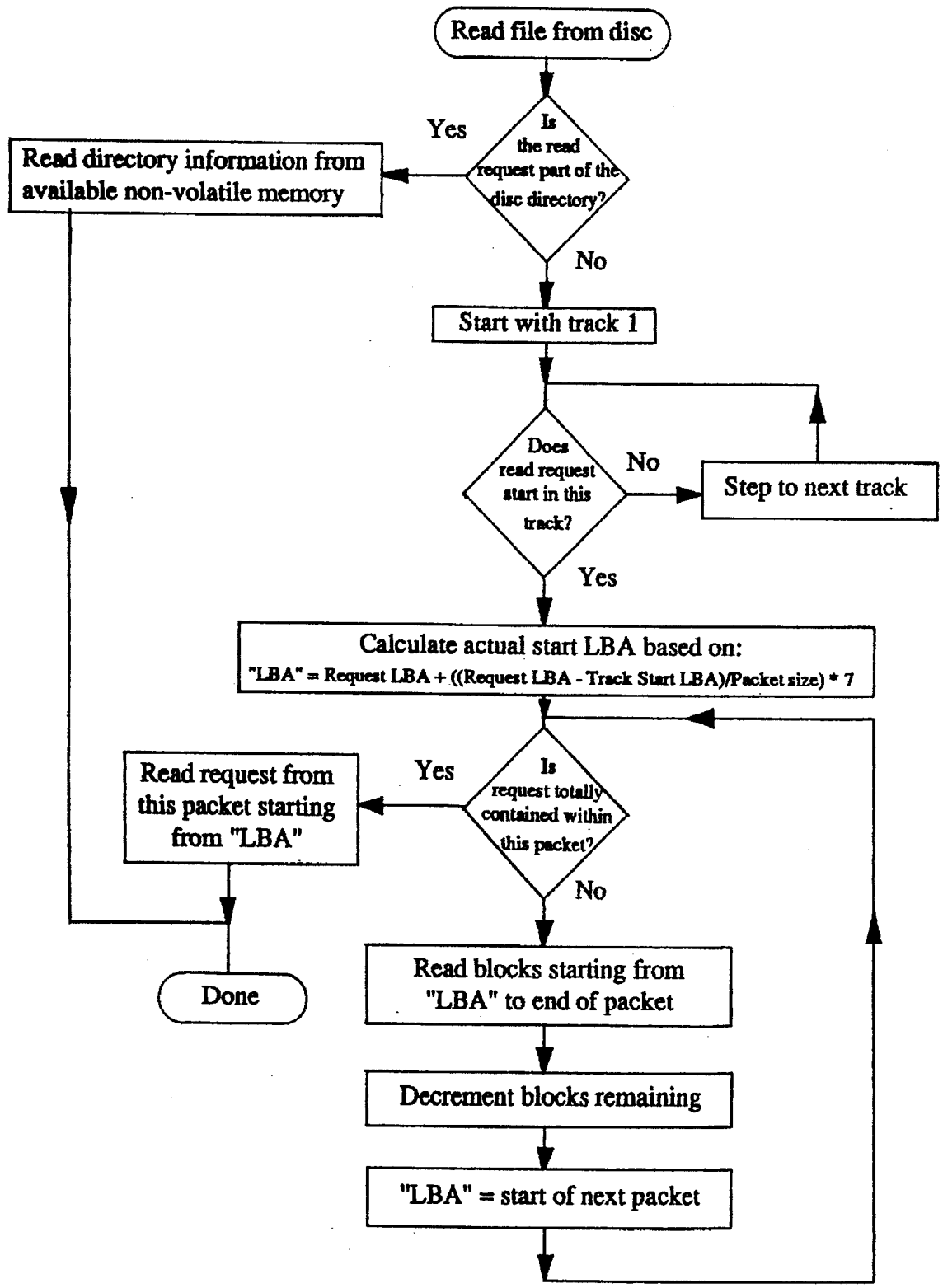
FIG. 7 is a logic diagram showing the response of a computer system operating in accordance with the invention is directed to read a file from a disc.

Reading files from a recordable CD (FIG. 6)

The Recording Technique uses the same procedure for reading a recordable CD regardless if it is used in a recordable CD drive or a standard CD-ROM drive (reader). Once the Recording Technique makes the recordable CD available to the computer operating system, any file read operation requested by the user must be converted to the proper user data block on the disc. The track info map is used to perform this conversion. First, the Recording Technique finds title recordable CD track where the logical block address of the start of the requested file resides by using the track info map track start and end logical block address information. Next, the logical block address of the user data block is calculated by the following equation:

logical block address=Request logical block address+((Request logical block address−Track Start logical block address)/Packet Size) * 7

Basically, this equation adds to the requested logical block address the number of run in and run-out blocks (7 per packet) that exist between the requested block and the start of the track.

If a read request is greater that the size of a packet, the Recording Technique breaks up the request so that each read operation does not span a packet. This is because the run in and run out blocks must always be skipped when reading.

The reason the track info map contains both the start and end logical block addresses for each track is because most CD-ROM readers only keep a record of the track start logical block addresses. Instead of maintaining the track end logical block address, only the lead-out area of the last session is available. The track info map's actual end logical block address of each track (not including the run in and run out blocks) allows the Recording Technique to locate the end blocks of all tracks.

In summary, when working with a CD-ROM reader; the Recording Technique uses the lead out information of the last session to locate the last block of the last track (which contains the track info map) on the disc. The Recording Technique then uses the track info map to determine the start and end logical block addresses for every track on the disc.

Although the present invention has been described in considerable detail with reference to certain preferred versions and uses thereof, other versions and uses are possible. Therefore, the spirit and scope of the appended claims should not be limited to the description of the preferred versions contained herein.

What is claimed is:

1. A method for entering new information on a recordable CDROM operatively connected an operating system of a computer system having an updatable memory comprising:
   a) opening a directory in an updatable memory, said directory being identifiable with a directory on a CDROM, said directory in the updatable memory constituting a working directory,
   b) storing the data on the CDROM and updating the working directory to reflect the data on the CDROM,
   c) upon completion of the data entry, copying the working directory from the updatable memory to the track on the CDROM containing the last entered data, writing a track information map, and closing the track where the data is entered, such that an operating system accessing data stored on the CDROM is routed by the working directory directly to the latest revision of such data on the CDROM, any previous versions of said data which are still present on the CDROM being transparent to the operating system.

2. The method of claim 1 further including working directory update means for use when the CDROM has data added thereto through use of the operating system, said update means comparing the working directory with the directory last entered on the CDROM and if the directories are different, transferring the directory on the last track of the CDROM to the working directory and deleting from the working directory all but the latest versions of each data entry.

3. The method of claim 1 further including means to update the directory of the contents of a CDROM after revision of information on the CDROM, said means rendering the prior versions of information transparent to the operating system while the operating system can recognize the location of the prior version of the information as occupied.

4. The method of claim 1 which further allows a user to repeatedly add and interchange recordable CDs between a CD reader and a recordable CD drive using sessions.

5. A computer system having a CDROM recorder attached thereto, the computer system being programmed to copy new information and amend old information on a recordable CDROM operatively connected to the operating system within the computer system also having an updatable, non-volatile memory system attached thereto, the program comprising:
   including the steps of:
   a) opening a directory in an updatable memory, said directory being identifiable with a directory on a CDROM, said directory in the updatable memory constituting a working directory,
   b) storing information on the CDROM and updating the working directory to reflect the information on the CDROM,
   c) upon completion of the information entry, copying said information and directory from the working memory to the track on the CDROM containing the last entered information, writing a track information map, and closing the track where the information is entered, such that an operating system accessing information stored on the CDROM is routed by the working directory directly to the latest revision of such information on the CDROM, any previous versions of said information which are still present on the CDROM being transparent to the operating system.

6. The system of claim 5 further including working directory update means for use when the CDROM has data added thereto through use of the operating system, said update means comparing the working directory with the directory last entered on the CDROM and if the directories are different, replacing the working directory with the directory on the last track of the CDROM.

7. The system of claim 5 further including means to update the directory of the contents of the CDROM after revision of information on the CDROM, said means rendering the prior versions of information transparent to the operating system while the operating system can recognize the location of the prior version of the information as occupied.

8. The system of claim 5 which further allows a user to repeatedly add and interchange recordable CDs between a CD reader and a recordable CD drive using sessions.

* * * * *